(12) United States Patent
Sasamoto

(10) Patent No.: US 7,589,929 B2
(45) Date of Patent: Sep. 15, 2009

(54) SERVO PATTERN WRITING APPARATUS, SERVO PATTERN WRITING METHOD, SERVO PATTERN READING APPARATUS, AND SERVO PATTERN READING METHOD

(75) Inventor: Tatsuro Sasamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/901,403

(22) Filed: Sep. 17, 2007

(65) Prior Publication Data
US 2008/0158717 A1 Jul. 3, 2008

(30) Foreign Application Priority Data
Dec. 28, 2006 (JP) ............... 2006-355030

(51) Int. Cl.
*G11B 21/02* (2006.01)
(52) U.S. Cl. ...................... 360/75; 360/77.08
(58) Field of Classification Search .............. None
See application file for complete search history.

(56) References Cited
U.S. PATENT DOCUMENTS 5,907,447 A * 5/1999 Yarmchuk et al. ............ 360/75

| | | | |
|---|---|---|---|
| 6,590,729 B1 | 7/2003 | Akagi et al. | |
| 6,904,010 B1 | 6/2005 | Kuroba et al. | |
| 2003/0099057 A1 | 5/2003 | Molstad | |
| 2007/0171564 A1* | 7/2007 | Ehrlich et al. | 360/77.08 |

FOREIGN PATENT DOCUMENTS

| EP | 0 129 708 | 1/1985 |
|---|---|---|
| JP | 9-251736 | 9/1997 |
| JP | 10-172254 | 6/1998 |
| JP | 2001-14818 | 1/2001 |

* cited by examiner

*Primary Examiner*—Andrew L Sniezek
(74) *Attorney, Agent, or Firm*—Greer, Burns & Crain, Ltd

(57) ABSTRACT

There is provided a technique capable of eliminating the need to create data for compensating the displacement of a servo pattern occurring at the time of writing the servo pattern using an amplitude method and thereby of significantly reducing the production time of a disk medium. A servo pattern writing apparatus that uses a write head to write a servo pattern on a recording medium according to an amplitude method, comprises: a position sensor that detects the displacement amount of the write head with respect to its reference position in the track crossing direction; and a delay amount adjustment circuit that writes a servo pattern in correspondence with a servo pattern write phase amount which is set for compensating the displacement amount detected by the position sensor at the time of demodulation of the servo pattern.

14 Claims, 13 Drawing Sheets

FIG.6

|  | BURST A | BURST B | BURST C | BURST D |
|---|---|---|---|---|
| AMPLITUDE | AMP A | AMP B | AMP C | AMP D |
| PHASE | PHASE A | PHASE B | PHASE C | PHASE D |

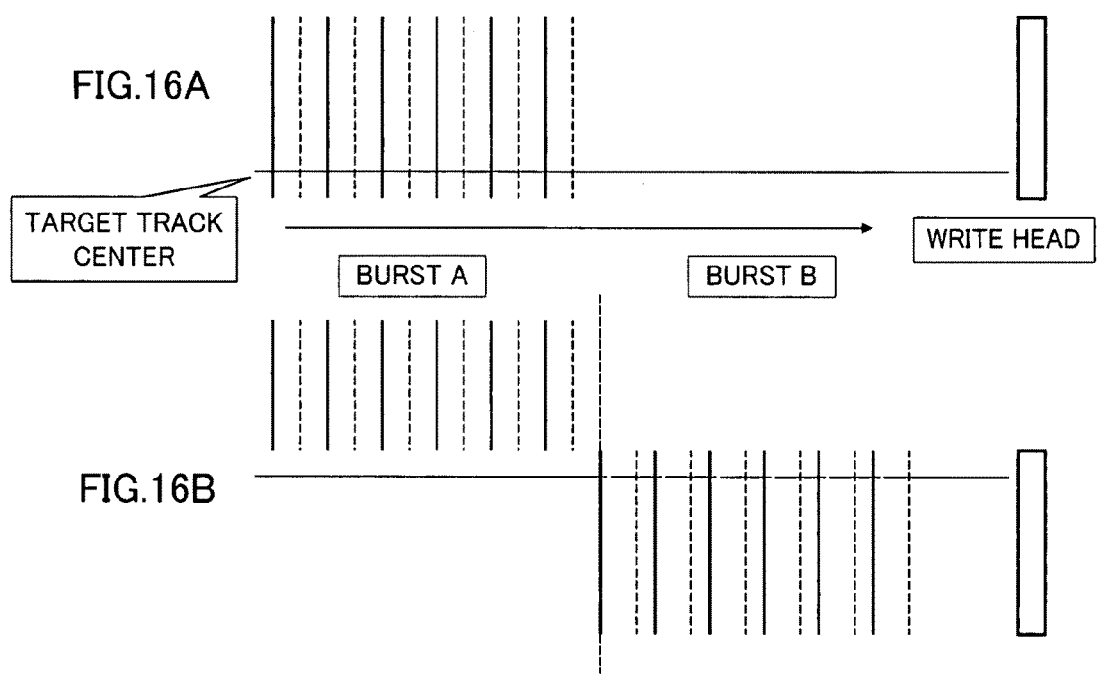

SERVO PATTERN WRITING APPARATUS, SERVO PATTERN WRITING METHOD, SERVO PATTERN READING APPARATUS, AND SERVO PATTERN READING METHOD

BACKGROUND OF THE INVENTION

1. Field of the Invention

The present invention relates to a servo pattern writing apparatus/method for writing a servo pattern on a recoding medium using an amplitude method and a servo pattern reading apparatus/method for reading a servo pattern that has been written on a recording medium using an amplitude method and, more particularly, to a technique for compensating the displacement of the position at which a servo pattern is written.

2. Description of the Related Art

When a servo pattern is to be written on a recording medium such as a magnetic disk, a facility or apparatus provided for its purpose is set so as not to be affected by vibration from outside. Further, various measures such as a reduction in wind disturbance inside the apparatus body are taken. Nevertheless, there still exits some influence of the disturbance, causing the head position at the time of writing a servo pattern to be slightly displaced from the ideal position in the vertical position of the track. The servo pattern written in this state does not exhibit the ideal position. Assuming that the ideal track is a one that forms a perfect circle, fine irregularities exist in the shape of the circumference of the circle. The irregularities that have been written on the medium periodically occur at the reading time, so that this phenomenon is referred to as "Repeatable Run-Out (RRO)".

A magnetic disk drive that uses a magnetic disk as a recording medium uses a magnetic head 32 to store information in one or more disk-like recording media (magnetic disks) 31, as shown in FIG. 11. In order to position the head 32 to a given target position accurately, a servo pattern 33 is written on the recording medium, as shown in FIG. 12. The servo pattern 33 typically has a configuration as shown in FIG. 13. As can be seen from FIG. 13, an amplitude servo pattern is written in a location 34 denoted by "Position" and is used for precise position measurement.

FIG. 14 shows an example of a servo pattern using an amplitude method (amplitude servo pattern). The amplitude servo pattern typically includes four burst patterns of burst A, burst B, burst C, and burst D, as shown in FIG. 14. For the sake of simplicity, only burst patterns A and B are used for the following description of servo pattern writing operation.

The burst A is first written as shown in FIG. 15A and then the burst B is written after the position of a write head is shifted as shown in FIG. 15B. A part of the burst A is erased by being overwritten by the burst B and thereby the edge of the burst A denotes a correct position of the center of a target track together with the newly written burst B.

At the time of reading the servo pattern, the point at which a read head equally straddles the burst A and burst B becomes the center of a target track. If the position of the write head is displaced from the target track center as shown in FIG. 16B at the time when the burst B is written, the position of the boundary between the burst A and burst B is correspondingly shifted to be displaced from the ideal center position. This is repeated in servo information corresponding to one rotation of a track, with the result that RRO is included in a demodulated position signal.

The above-mentioned amplitude servo pattern is written by a dedicated device called an STW (Servo Track Writer). After that, in a state where a recording medium on which the servo pattern has been written is set in, e.g., a magnetic disk drive, the position of the servo pattern is checked, the displacement amount of the servo pattern from the ideal position is calculated, and the calculated amount is written as an RRO compensation value in a post data area in the form of a digital value.

Several tens to several hundreds of servo patters are written for each rotation of a track, and several tens of thousands of tracks are formed on a recording medium. In order to measure the RRO, it is necessary first to determine the positions of a plurality of circumferences whose radii are different from one another and then to measure using the circumferences. Therefore, it requires a huge amount of time to create data for RRO compensation, which become bottleneck for mass production.

As another method, there is known one that changes the length of the burst pattern to be integrated to thereby compensate a displacement in the track direction [refer to, e.g., Patent Document 1 [U.S. Pat. No. 5,907,447] (FIG. 13)].

Further, as still another method, there is known one that uses a phase servo pattern. This method writes the servo pattern while adjusting the phase thereof to thereby compensate the displacement in the track direction (refer to, e.g., Patent Document 2 [Jpn. Pat. Appln. Laid-Open Publication No. 10-172254] (FIG. 17 and subsequent figures)].

As described above, the method that uses an amplitude servo pattern has a disadvantage that it requires a huge amount of time to create data for RRO compensation.

Further, in the method disclosed in Patent Document 1, it is necessary to ensure the area for the burst pattern up to the size required for compensating the burst pattern at the maximum level. The ensured area typically becomes an unused area, thereby significantly deteriorating area efficiency. Further, the method disclosed in Patent Document 2 has disadvantages that a servo writing system to be used is limited to the phase servo system and effect produced by the compensation is small.

SUMMARY OF THE INVENTION

The present invention has been made to solve the problem, and an object thereof is to provide a technique capable of eliminating the need to create data for compensating the displacement of a servo pattern occurring at the time of writing the servo pattern using an amplitude method and thereby of significantly reducing the production time of a disk medium. Another object of the present invention is to provide a technique capable of reducing the influence of the displacement when reading a servo pattern from a disk medium onto which the servo pattern has been written using the above technique.

To solve the above problems, according to a first aspect of the present invention, there is provided a servo pattern writing apparatus that uses a write head to write a servo pattern on a recording medium according to an amplitude method, comprising: a displacement amount detection section that detects the displacement amount of the write head with respect to its reference position in the track crossing direction; and a write section that writes a servo pattern in correspondence with a servo pattern write phase amount which is set for compensating the displacement amount detected by the displacement amount detection section at the time of demodulation of the servo pattern.

In the servo pattern writing apparatus according to the present invention, the servo pattern includes a plurality burst patterns, and the phase amount corresponds to a delay amount between a first burst pattern to be written on one track and a second burst pattern that follows the first burst pattern.

Further, according to a second aspect of the present invention, there is provided a servo pattern writing method that uses a write head to write a servo pattern on a recording medium according to an amplitude method, comprising: a displacement amount detection step that detects the displacement amount of the write head with respect to its reference position in the track crossing direction; and a write step that writes a servo pattern in correspondence with a servo pattern write phase amount which is set for compensating the displacement amount detected by the displacement amount detection step at the time of demodulation of the servo pattern.

Further, according to a third aspect of the present invention, there is provided a servo pattern reading apparatus that reads a servo pattern that has been written according to an amplitude method from a recording medium, comprising: a phase amount detection section that detects the phase amount between servo patterns; and a demodulation section that demodulates a servo pattern by compensating the displacement amount of a servo pattern with respect to its reference position based on the phase amount detected by the phase amount detection section.

Further, according to a fourth aspect of the present invention, there is provided a servo pattern reading method that reads a servo pattern that has been written according to an amplitude method from a recording medium, comprising: a phase amount detection step that detects the phase amount between servo patterns; and a demodulation step that demodulates a servo pattern by compensating the displacement amount of a servo pattern with respect to its reference position based on the phase amount detected by the phase amount detection step.

According to the present invention, it is possible to eliminate the need to create data for compensating the displacement of a servo pattern occurring at the time of writing the servo pattern using an amplitude method and thereby to significantly reduce the production time of a disk medium.

Further, according to the present invention, it is possible to reduce the influence of the displacement when reading a servo pattern from a disk medium having the above advantage.

BRIEF DESCRIPTION OF THE DRAWINGS

FIG. 6 is a table showing a relationship between the amplitude and phase that have been read out;

FIGS. 16A and 16B show an example of the servo pattern whose position has been displaced from a target track center.

DETAILED DESCRIPTION OF THE PREFERRED EMBODIMENTS

Embodiments of the present invention will be described below with reference to the accompanying drawings.

First Embodiment

As a first embodiment, a servo pattern writing apparatus/method according to the present invention will be described.

Figure 1:
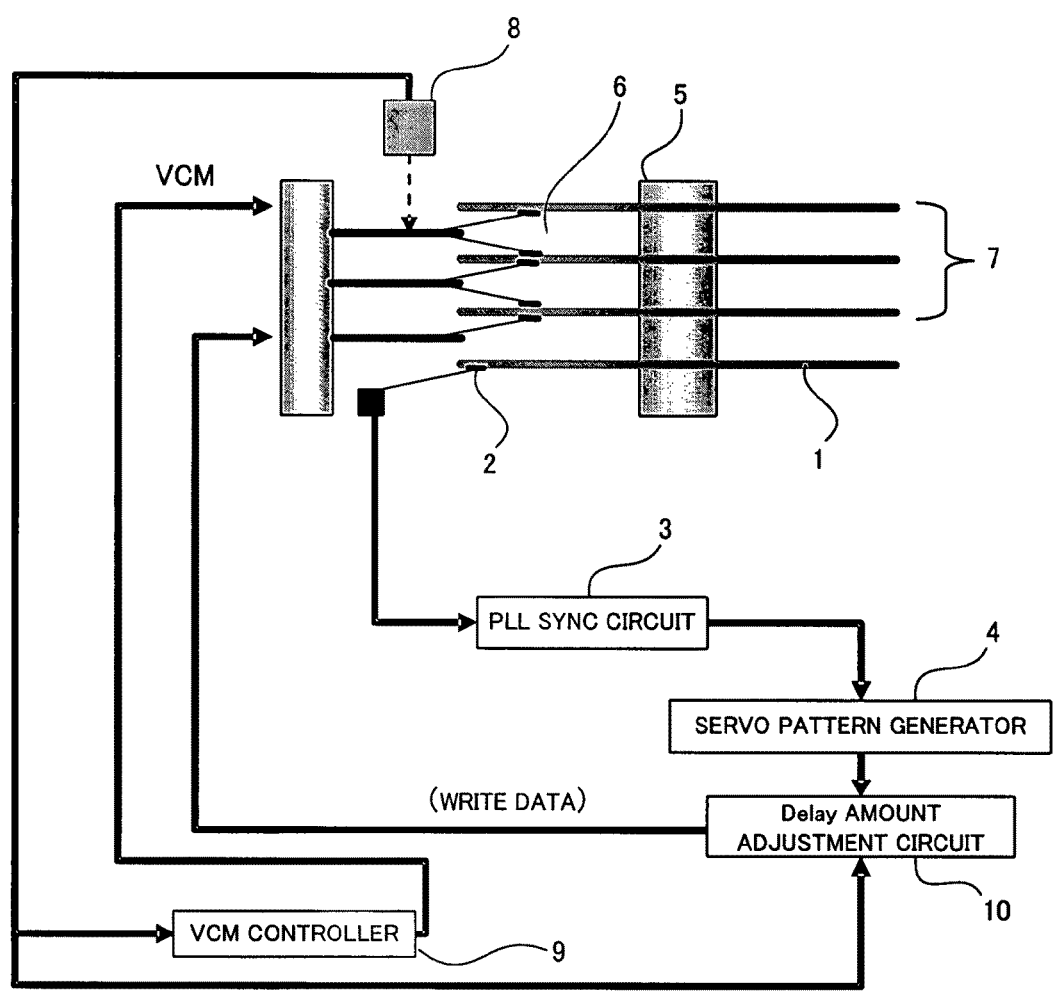
FIG. 1 is a block diagram showing an STW so as to explain a first embodiment of the present invention.

FIG. 1 is a block diagram showing an STW serving as a servo pattern writing apparatus according to the present invention. The STW has a clock information storage medium (e.g., magnetic disk) 1 and a clock head 2. The STW uses the clock head 2 to read clock timing and allows a PLL sync circuit 3 to operate at the clock timing, thereby allowing a servo pattern generator 4 to generate a servo pattern.

Then, the STW uses a write head 6 to write the servo pattern obtained by the servo pattern generator 4 on another medium (medium for recording servo pattern) 7 based on the timing read out from the clock information storage medium 1 perfectly in sync with the rotation of a spindle motor (SPM) 5. An optical position sensor 8 is used for head positioning control performed by a voice coil motor (VCM) 9 in general. However, in the present embodiment, the position sensor 8 is also used as a sensor for detecting the amount of displacement (displacement in the vertical direction from a track reference position) from a target track, and the detected displacement amount is input to a delay amount adjustment circuit 10.

The delay amount adjustment circuit 10 adjusts a delay amount which corresponds to the phase amount of the servo pattern based on outputs from the servo pattern generator 4 and position sensor 8 and writes the servo pattern on the medium 7 for recording servo pattern. The position sensor 8 corresponds to a displacement amount detection section of the present invention, and write head 6 and delay amount adjustment circuit 10 correspond to a write section of the present invention.

Here, operation in the present embodiment will be described in a conceptual manner.

Figure 2:
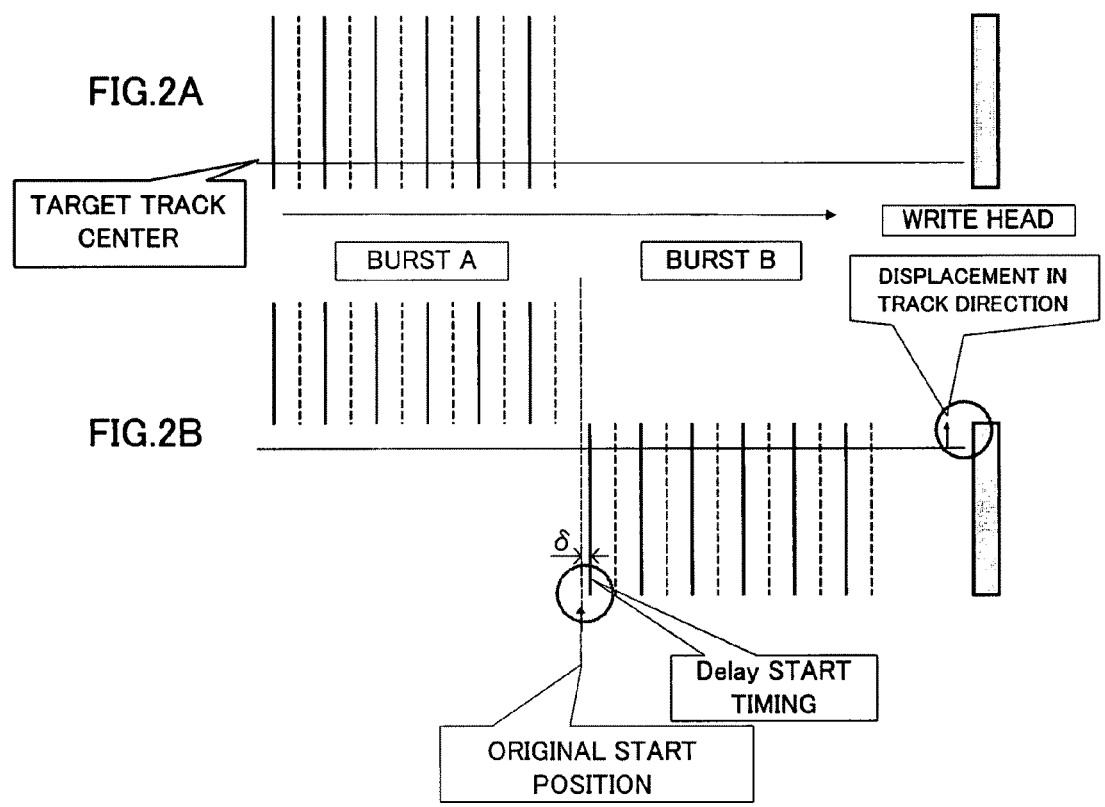
FIGS. 2A and 2B are conceptual views for explaining operation of the first embodiment, which show a servo pattern that has been written on a track.
Figure 14:
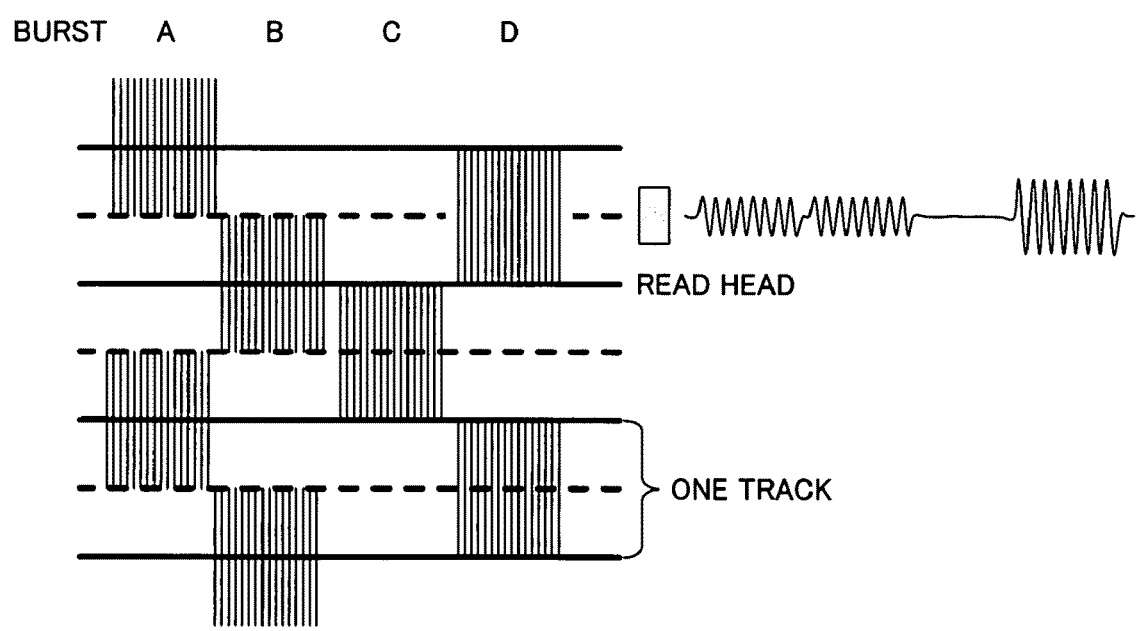
FIG. 14 is a view showing an example of a servo pattern using bursts A to D.
Figure 15A:
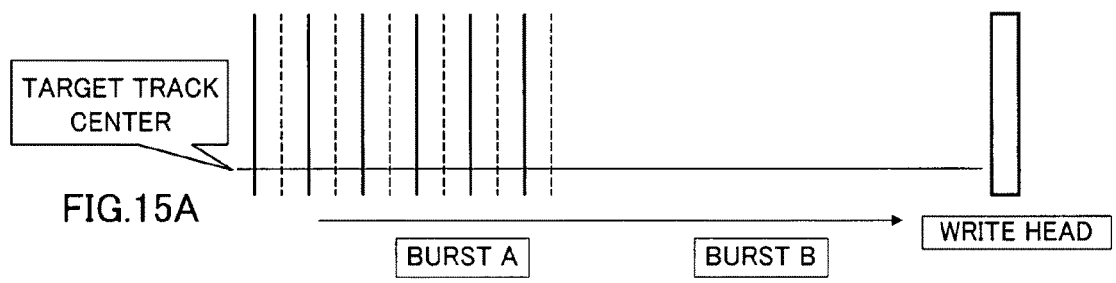
FIGS. 15A and 15B show an example of the servo pattern to be written on a target track.
Figure 15B:
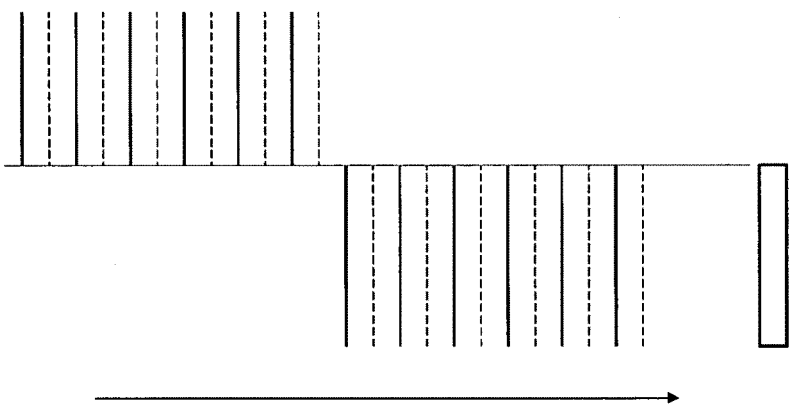

As in the case of the prior art described above, it is assumed that a servo pattern has a pattern as shown in FIG. 14. In the operation according to the present embodiment, when the burst B shown in FIG. 16B is written, a compensation amount corresponding to the displacement amount obtained from the position sensor 8 is made proportional to the phase shift amount (delay amount) of a pattern to be written and start timing of writing the burst B is delayed by a delay amount of δ shown in FIG. 2B. FIG. 2A shows the same pattern as that shown in FIG. 16A.

For example, compensation is made as follows. If the write head is located at an ideal location in the track crossing direction, phase shift amount is set to 0. If the position of the write head is displaced from the ideal location, the start timing of writing the burst B is shifted (delayed) by 0.1 ns on a per displacement amount of 1 nm. Assuming that the frequency of a signal to be written is 100 MHz, its cycle time is 10 ns. In terms of the phase amount, 3.6 [degree] (=360*0.1/10) is obtained. Although a correspondence between the displacement amount and phase shift amount may arbitrarily determined, a setting in which the phase shift amount exceeds the burst width is meaningless.

Figure 3:
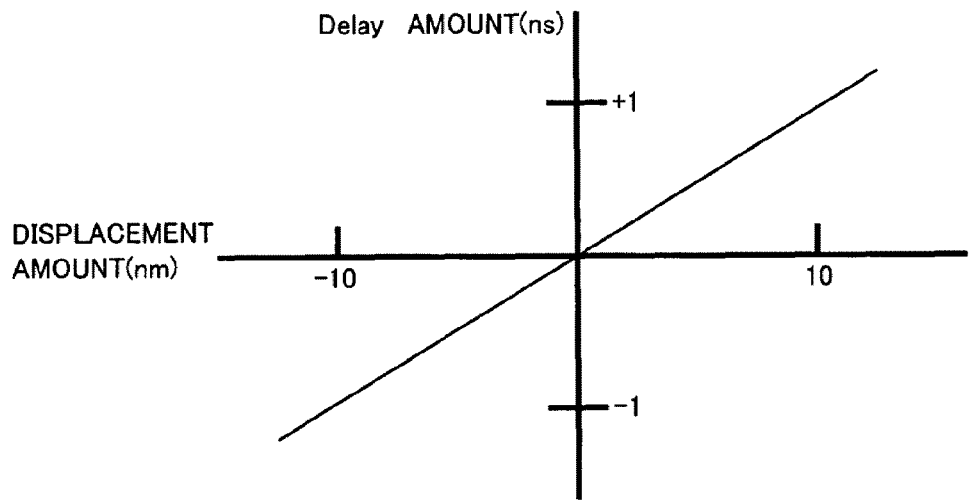
FIG. 3 is a view showing a relationship between displacement amount and phase amount (delay amount)

FIG. 3 shows a relationship in which the phase is shifted in accordance with the displacement amount of the write head in track direction at the time of the STW. If the displacement amount of the head from a target position is 10 nm in a state shown in FIG. 2B, the start timing of writing the burst B is delayed by 1 ns. This operation is repeated when the servo pattern is written for each sector and each track. As described above, the burst B is written by a shift amount corresponding to the displacement amount of the head from a target track.

Figure 4:
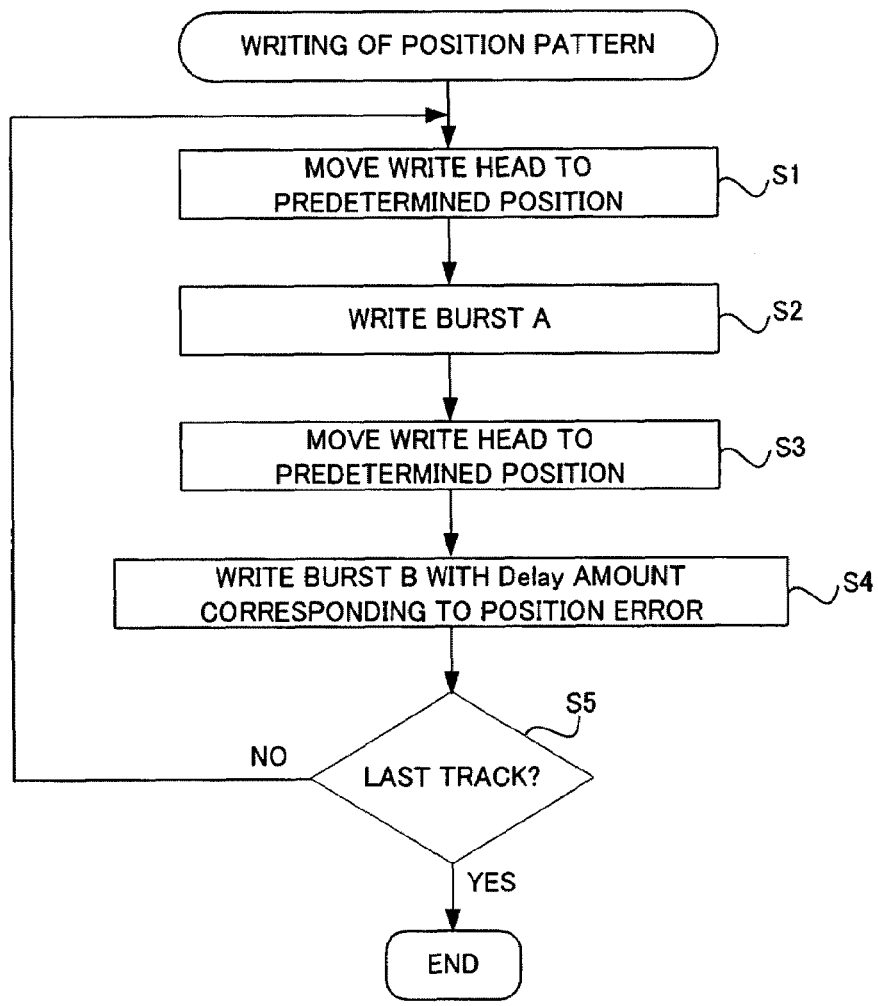
FIG. 4 is a flowchart showing operation according to the first embodiment.

FIG. 4 is a flowchart showing writing operation of a position pattern so as to explain the operation according to the present embodiment.

The write head 6 is moved to a predetermined position (step S1), and the burst A is written at that position (step S2). Then, the write head 6 is moved to a predetermined position (step S3) and, at the same time, displacement amount of the write head 6 in the track crossing direction from a reference position of the write head 6 is detected based on the position signal from the position sensor 8, and the burst B is written with a delay amount (phase amount) corresponding to the displacement amount (step S4). Then, it is determined that the current track is the last one (step S5). In the case where the current track is the last one (Yes in step S5), this flow is ended. Otherwise (N in step S5), the flow returns to step S1, from which the same operation as above is repeated.

In some STW systems, such a clock head is not provided. In this case, however, a means for obtaining a signal in sync with the rotation of the medium is provided as a substitute for the clock head, and the obtained signal can serve as a substitute for the input from the clock head.

Further, there exist some STW systems that are not provided with the optical position sensor. In this case, however, a means for recognizing the head position, such as the position information of another servo pattern that has already been written can be used as a substitute for the sensor input.

The writing operation according to the present embodiment is performed at the time the STW, and demodulation corresponding to compensation is performed at the time of demodulation of the servo information in, e.g., a magnetic disk drive, thereby bringing the RRO close to 0 as described later in FIG. 10.

Second Embodiment

As a second embodiment, a servo pattern reading apparatus/method according to the present invention will be described. The second embodiment is applied to a case where the servo pattern is demodulated on, e.g., a magnetic disk drive.

Figure 5:
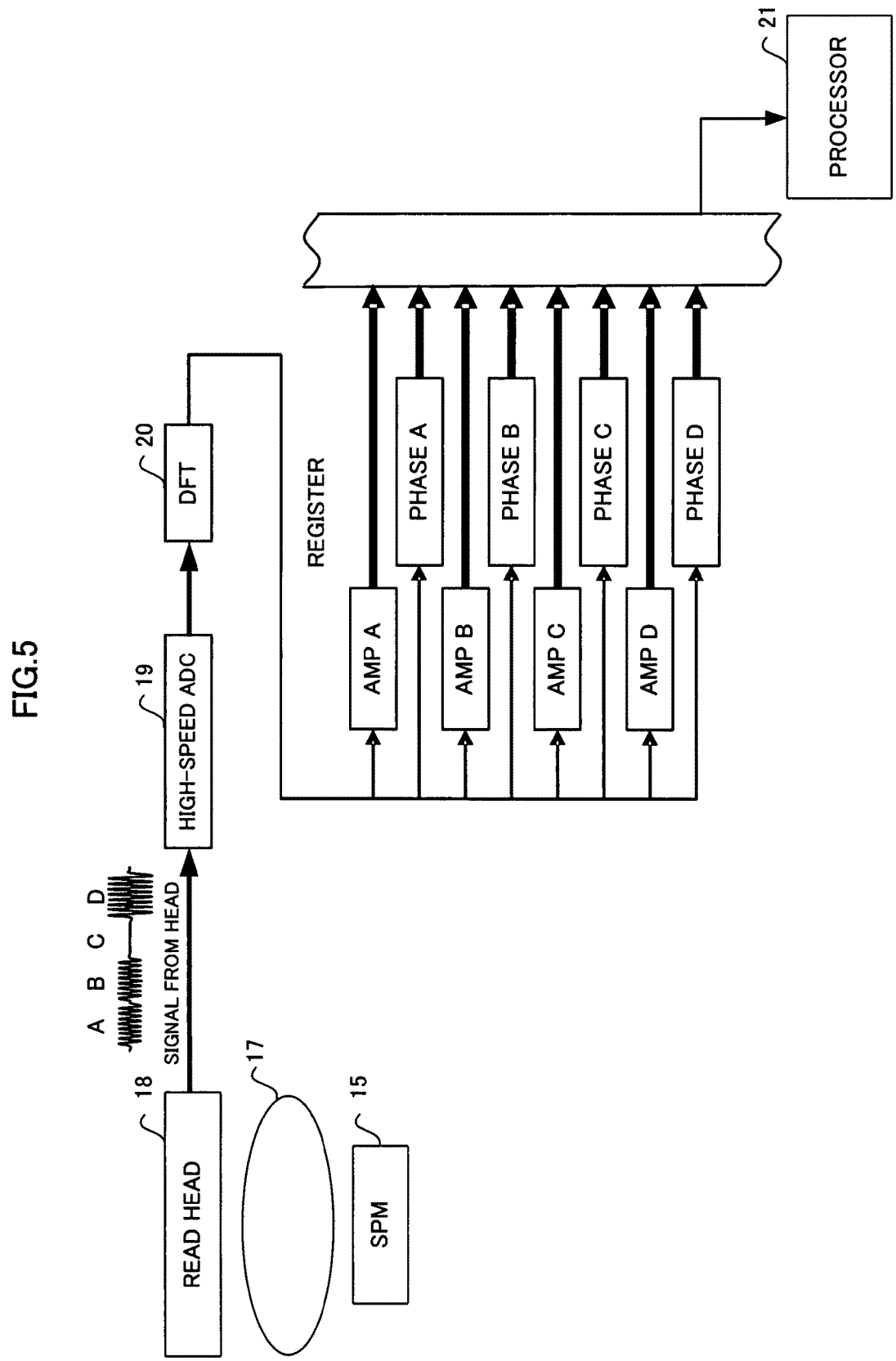
FIG. 5 is a block diagram showing a demodulation circuit section of a magnetic disk drive.

FIG. 5 is a block diagram showing the main part (demodulation circuit section) of a magnetic disk drive in the second embodiment. The magnetic disk drive shown in FIG. 5 includes a magnetic disk 17 which is a recording medium rotated by a spindle motor 15, a read head 18 that reads out information from the magnetic disk 17, a high-speed ADC 19 that converts, at high speed, an analog signal read by the read head 18 to a digital signal, a DFT 20 that performs a discrete Fourier transformation for the digital signal obtained by the high-speed ADC 19, amplitude registers (A to D) that store amplitudes of respective bursts (burst patterns) A, B, C, and D based on an output signal of the DFT 20, and phase registers (A to D) that stores phases (delay amounts) of the respective bursts. Outputs of the amplitude registers (A to D) and phase resisters (A to D) are transmitted to a processor 21 via a bus.

Figure 7:
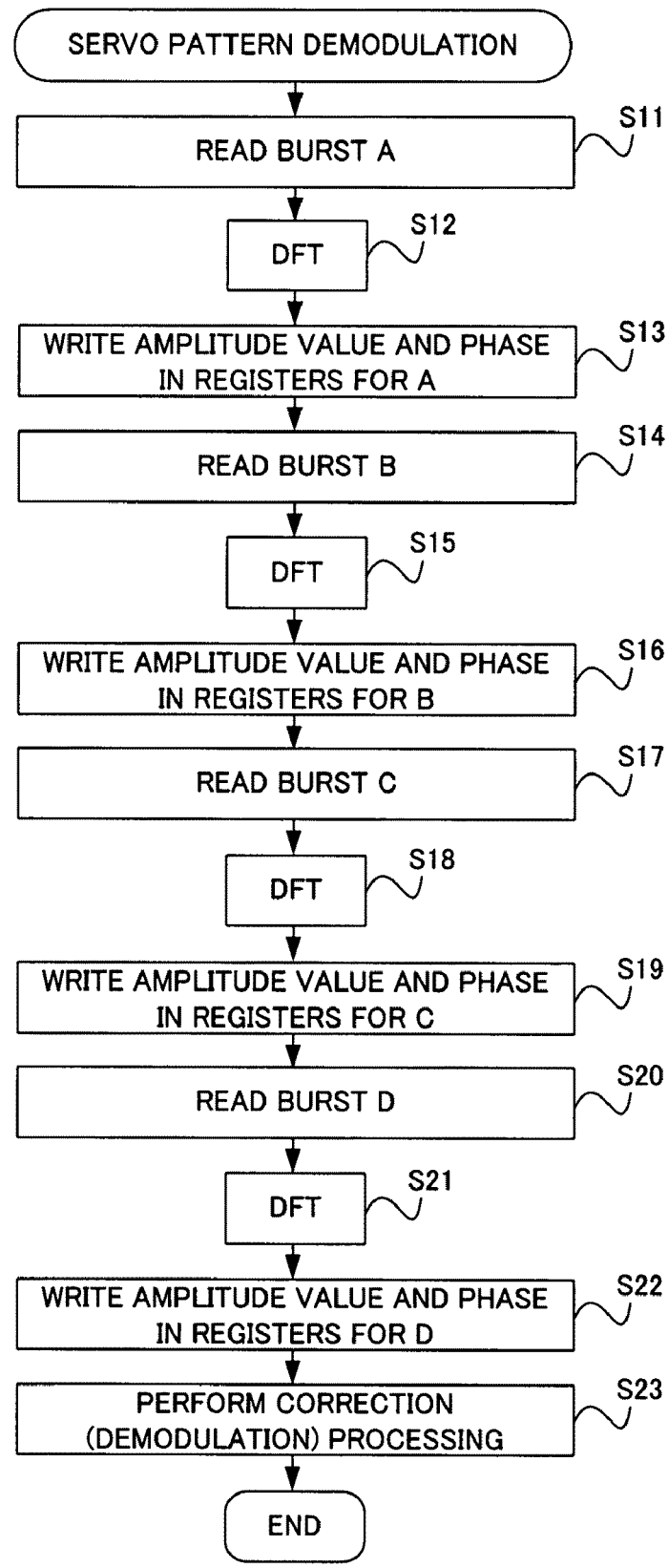
FIG. 7 is a flowchart showing read operation of the servo pattern.

In the above configuration, a read out signal from the read head 18 is converted into a digital value by the high-speed ADC 19. The DFT is performed for respective areas of bursts A, B, C, and D, and amplitude information concerning the fundamental frequency of the bursts A, B, C, and D are set in the respective registers so as to be transmitted to the processor 21. FIG. 6 is a table showing the read out information. FIG. 7 is a flowchart showing demodulation operation for acquiring the above information. The high-speed ADC 19, DFT 20, amplitude resisters A to D, and phase registers A to D correspond to a phase amount detection section of the present invention. The processor 21 corresponds to a demodulation section of the present invention that uses the phase amounts and amplitudes of the bursts constituting the servo pattern to demodulate the servo pattern.

In the demodulation operation shown in FIG. 7, the bursts A, B, C, and D are read (steps S11, S14, S17, and S20), the DFT is performed for the read bursts A, B, C, and D (steps S12, S15, S18, and S21), and the amplitudes and phases thereof are written in the respective registers (steps S13, S16, S19, and S22). After the amplitudes and phases of all the bursts have been acquired, the processor 21 uses the following equations (3) and (4) to perform correction (demodulation) processing (step S23).

In a typical (conventional) method, a difference between burst A and burst B and difference between burst C and burst D are calculated, and the obtained value becomes a position error signal (PES) representing the displacement from the track center.

$$\text{PES } N = \text{AMP } A - \text{AMP } B \tag{1}$$

$$\text{PES } Q = \text{AMP } C - \text{AMP } D \tag{2}$$

In the present embodiment, the shift amount includes a compensation signal corresponding to the phase shift, so that terms indicative of the phase are taken into account.

$$\text{PES } N = \text{AMP } A - \text{AMP } B + K^*(\text{PHASE } A - \text{PHASE } B) \tag{3}$$

$$\text{PES } Q = \text{AMP } C - \text{AMP } D + K^*(\text{PHASE } C - \text{PHASE } D) \tag{4}$$

In the above equations, K is a conversion factor between the phase and displacement amount shown in FIG. 3. When the bursts A and C are written, phase shifts thereof are generally set to 0, so that this term can be omitted. Since it is impossible to obtain a linear signal at all positions on the medium only with the amplitudes of bursts A, B, C, and D in general, PES N and PES Q are created from the bursts A, B and bursts C, D respectively.

Figure 8:
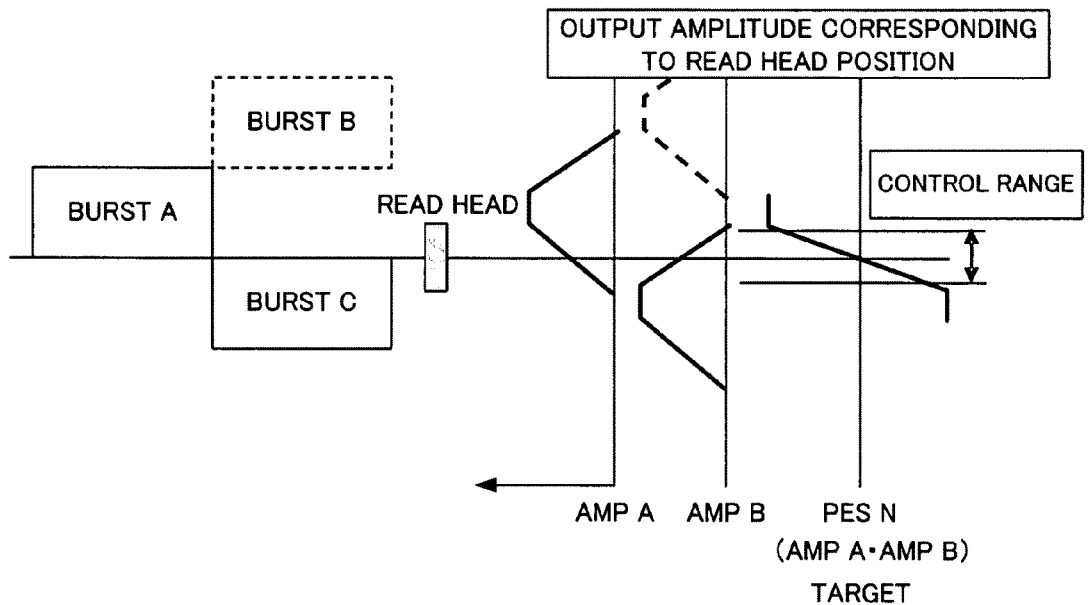
FIG. 8 shows a view showing a relationship between position and output amplitudes in the case where a PES signal is created from burst signals.
Figure 9:
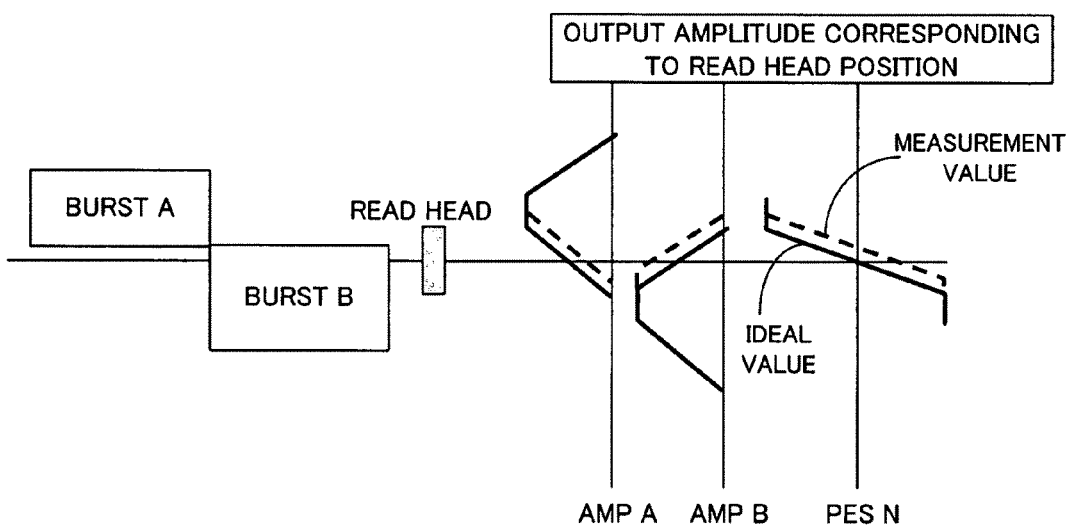
FIG. 9 is a view showing a relationship between position and output amplitudes in the case where the position of the written burst B has been displaced in a state of FIG. 8.

FIGS. 8 and 9 each show a relationship between PES N and output amplitudes corresponding to the positions of bursts A and B. FIG. 8 is a case obtained by using equations (1) and (2), wherein there occurs no displacement in the track crossing direction when the burst B is written.

As denoted by dotted lines of FIG. 9, it is impossible for even the PES to exhibit a correct value in the method according to the equations (1) and (2) which use only the amplitude in the case where there occurs a displacement in the track direction at the time of writing the burst B. The displaced measurement values (dotes lines) can be set back to correct values (straight line) by using the equations (3) and (4).

Figure 10A:
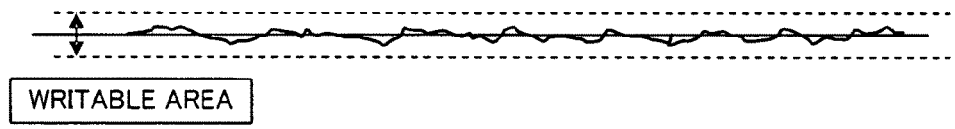
FIG. 10A is a view showing a result of read operation obtained in the case where the compensation according to the second embodiment has not been made.
Figure 10B:
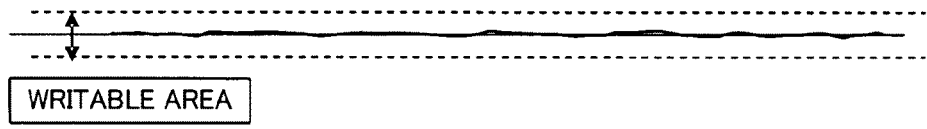
FIG. 10B is a view showing a result of read operation obtained in the case where the compensation according to the second embodiment has been made.
Figure 11:
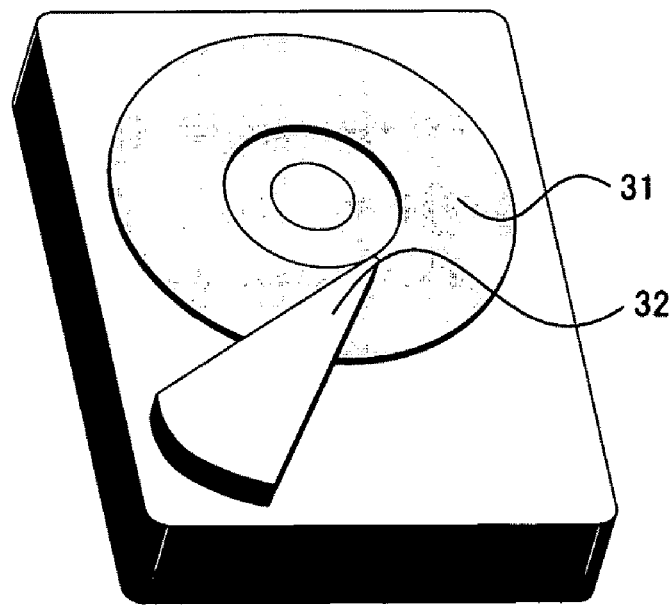
FIG. 11 is a view showing a configuration of a magnetic disk drive.
Figure 12:
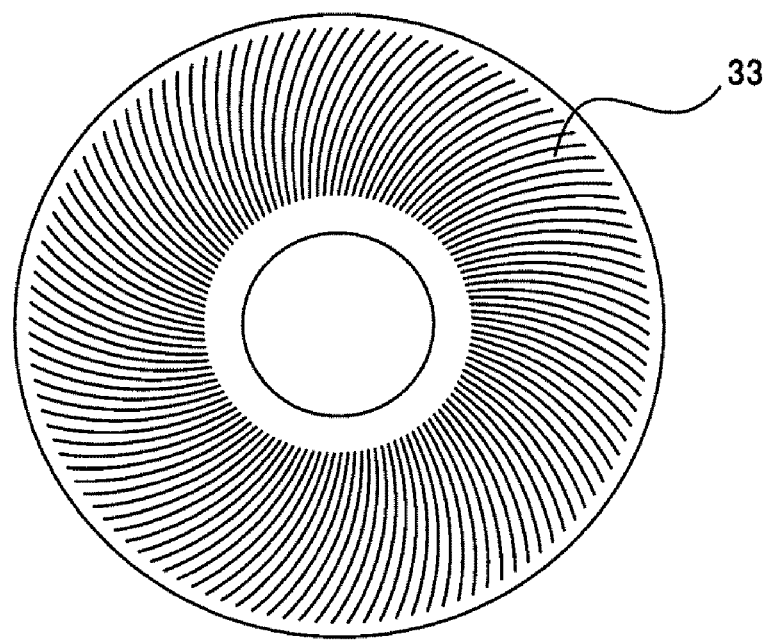
FIG. 12 is a view showing a servo pattern on a recording medium.
Figure 13:
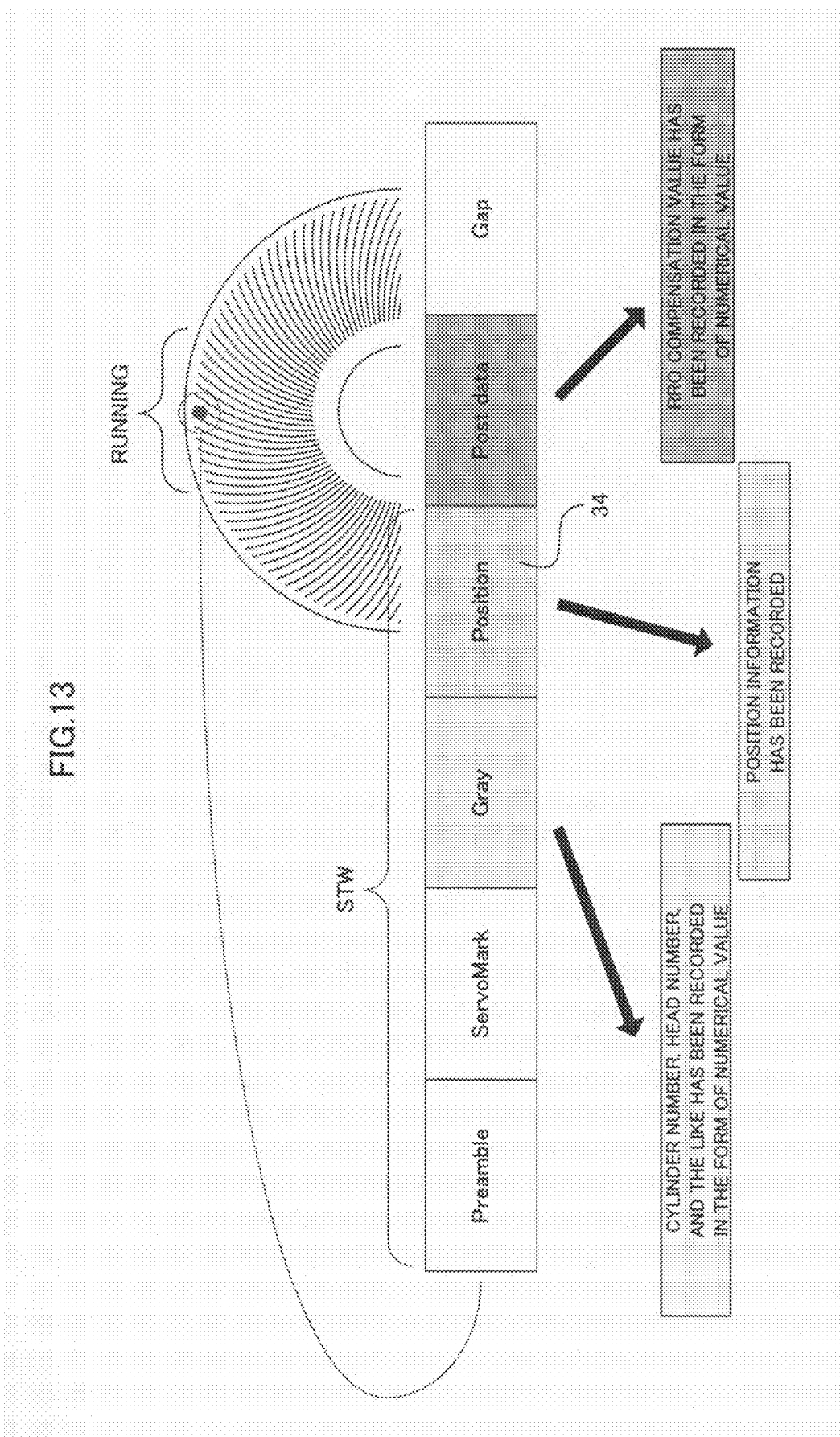
FIG. 13 is a view showing an example of a configuration of the servo pattern.

FIG. 10A shows a demodulation signal corresponding to one rotation of a track, which is written without compensation. This signal denotes the head position to represent position error, so that it is referred to as PES (Position Error Signal). FIG. 10B shows a PES signal obtained in the case where the compensation according to the present embodiment has been made.

In the case where the RRO exists as shown in FIG. 10A, the interval between adjacent tracks does not remain constant. At the time of determining the head position in, e.g., a magnetic disk drive, random component such as wind disturbance, vibration from outside, or noise generated in a circuit is added. If the interval between adjacent tracks becomes small in such a condition, there arises a danger that a write operation to a track erases data recorded on the adjacent track.

In order to prevent this, a predetermined threshold value is provided for the PES signal at the time of write operation and, if the threshold value is exceeded, the write operation is avoided. In this case, the write operation is performed once again in the next rotation or later, significantly deteriorating data transfer rate. By applying the compensation according to the present embodiment to reduce the RRO value, write margin becomes large as shown in FIG. 10B, thereby preventing degradation of performance or an erroneous erase of data on the adjacent track.

What is claimed is:

1. A servo pattern writing apparatus that uses a write head to write a servo pattern on a recording medium according to an amplitude method, comprising:
    a displacement amount detection section that detects the displacement amount of the write head with respect to a reference position in a track crossing direction, the reference position in the track crossing direction being set for a servo pattern on a target track; and
    a write section that brings the displacement amount detected by the displacement amount detection section into correspondence with a servo pattern write phase amount and writes a servo pattern according to the servo pattern write phase amount.

2. The servo pattern writing apparatus according to claim 1, wherein
    the servo pattern includes a plurality burst patterns, and
    the phase amount corresponds to a delay amount between a first burst pattern to be written on one track and a second burst pattern that follows the first burst pattern.

3. The servo pattern writing apparatus according to claim 1, wherein
    the recording medium is a magnetic disk.

4. The servo writing apparatus according to claim 1, wherein
    the servo pattern includes a first burst pattern and a second burst pattern,
    the write section writes the first burst pattern on the target track,
    the displacement amount detection section detects a displacement amount of the first burst pattern with respect to the reference position as the displacement amount of the write head, and
    the write section writes the second burst pattern on the target track according to the phase amount.

5. The servo pattern writing apparatus according to claim 4, wherein the second burst pattern on the target track is delayed the phase amount from the first burst pattern in a track direction.

6. A servo pattern writing method that uses a write head to write a servo pattern on a recording medium according to an amplitude method, comprising:
    a displacement amount detection step that detects the displacement amount of the write head with respect to a reference position in a track crossing direction, the reference position in the track crossing direction being set for a servo pattern on a target track; and
    a write step that brings the displacement amount detected by the displacement amount detection step into correspondence with a servo pattern write phase amount and writes a servo pattern according to the servo pattern write phase amount.

7. The servo pattern writing method according to claim 6, wherein
    the servo pattern includes a plurality burst patterns, and
    the phase amount corresponds to a delay amount between a first burst pattern to be written on one track and a second burst pattern that follows the first burst pattern.

8. The servo pattern writing method according to claim 6, wherein
    the recording medium is a magnetic disk.

9. A servo pattern reading apparatus that reads a servo pattern that has been written according to an amplitude method from a target track on a recording medium, the servo pattern including a plurality of burst patterns, comprising:
    a phase amount detection section that detects a phase amount between two burst patterns included in the servo pattern; and
    a demodulation section that compensates a displacement amount of a servo pattern with respect to a reference position in a track crossing direction based on the phase amount detected by the phase amount detection section, so as to demodulate the servo pattern, the reference position being set for the servo pattern on the target track.

10. The servo pattern reading apparatus according to claim 9, wherein
    one of the two burst patterns included in the servo pattern follows another of the two burst patterns included in the servo pattern.

11. The servo pattern reading apparatus according to claim 9, wherein
    the servo pattern reading apparatus is a magnetic disk drive.

12. A servo pattern reading method that reads a servo pattern that has been written according to an amplitude method from a target track on a recording medium, the servo pattern including a plurality of burst patterns, comprising:
    a phase amount detection step that detects a phase amount between two burst patterns included in the servo pattern; and
    a demodulation step that compensates a displacement amount of a servo pattern with respect to a reference position in a track crossing direction based on the phase amount detected by the phase amount detection step, so as to demodulate the servo pattern, the reference position being set for the servo pattern on the target track.

13. The servo pattern reading method according to claim 12, wherein
    one of the two burst patterns included in the servo pattern follows another of the two burst patterns included in the servo pattern.

14. The servo pattern reading method according to claim 12, wherein
    the recording medium is a magnetic disk.

* * * * *